United States Patent [19]

Hehl

[11] Patent Number: 5,017,121
[45] Date of Patent: May 21, 1991

[54] INJECTION MOLDING MACHINE COMPRISING A PROTECTIVE COVERING

[76] Inventor: Karl Hehl, Arthur-Hehl-Strasse 32, D-7298 Lossburg 1, Fed. Rep. of Germany

[21] Appl. No.: 464,597

[22] Filed: Jan. 12, 1990

Related U.S. Application Data

[63] Continuation-in-part of Ser. No. 286,066, Dec. 19, 1988, abandoned, and a continuation-in-part of Ser. No. 406,833, Sep. 11, 1989.

[30] Foreign Application Priority Data

Dec. 30, 1987 [DE] Fed. Rep. of Germany ....... 3744523
Sep. 12, 1988 [DE] Fed. Rep. of Germany ....... 3830964

[51] Int. Cl.$^5$ ............................................. B29C 45/42
[52] U.S. Cl. .................... 425/151; 414/751; 425/444; 425/556; 425/575; 901/16
[58] Field of Search ............ 901/16; 414/751; 425/151, 554, 556, 574, 575, 444

[56] References Cited

U.S. PATENT DOCUMENTS

| | | | |
|---|---|---|---|
| 4,578,026 | 3/1986 | Hehl | 425/151 |
| 4,775,309 | 10/1988 | Hehl | 425/135 |
| 4,781,571 | 11/1988 | Heindl | 425/444 |

OTHER PUBLICATIONS

"Flexible Production Systems", Battenfeld Maschinenfabriken GmbH, Feb. 1985, pp. 1-14.

Primary Examiner—Timothy Heitbrink
Attorney, Agent, or Firm—Spencer & Frank

[57] ABSTRACT

An injection molding machine has a pedestal having front and rear vertical walls extending in a longitudinal direction and defining interior chambers, a mold carried by the pedestal, a clamping unit mounted on the pedestal and horizontally operable to open and close the mold, an injecting unit including a plasticizing cylinder and being mounted on the pedestal, two horizontal carrying bars, one being a front bar and the other being a rear bar, interconnected by crosspieces and supported by the pedestal, and a front protective covering carried by the pedestal and including a stationary protective carrier and two vertical protective doors. There are further provided stationary tracks mounted on the front bar and being adapted to guide the protective doors in the longitudinal direction of the injection molding machine. Further, track rails are mounted on each of the carrying bars and extending at least in part above the clamping unit. A first carriage is mounted on the track rails for travel thereon and an additional carriage is supported on the first carriage and includes a hoisting device.

19 Claims, 11 Drawing Sheets

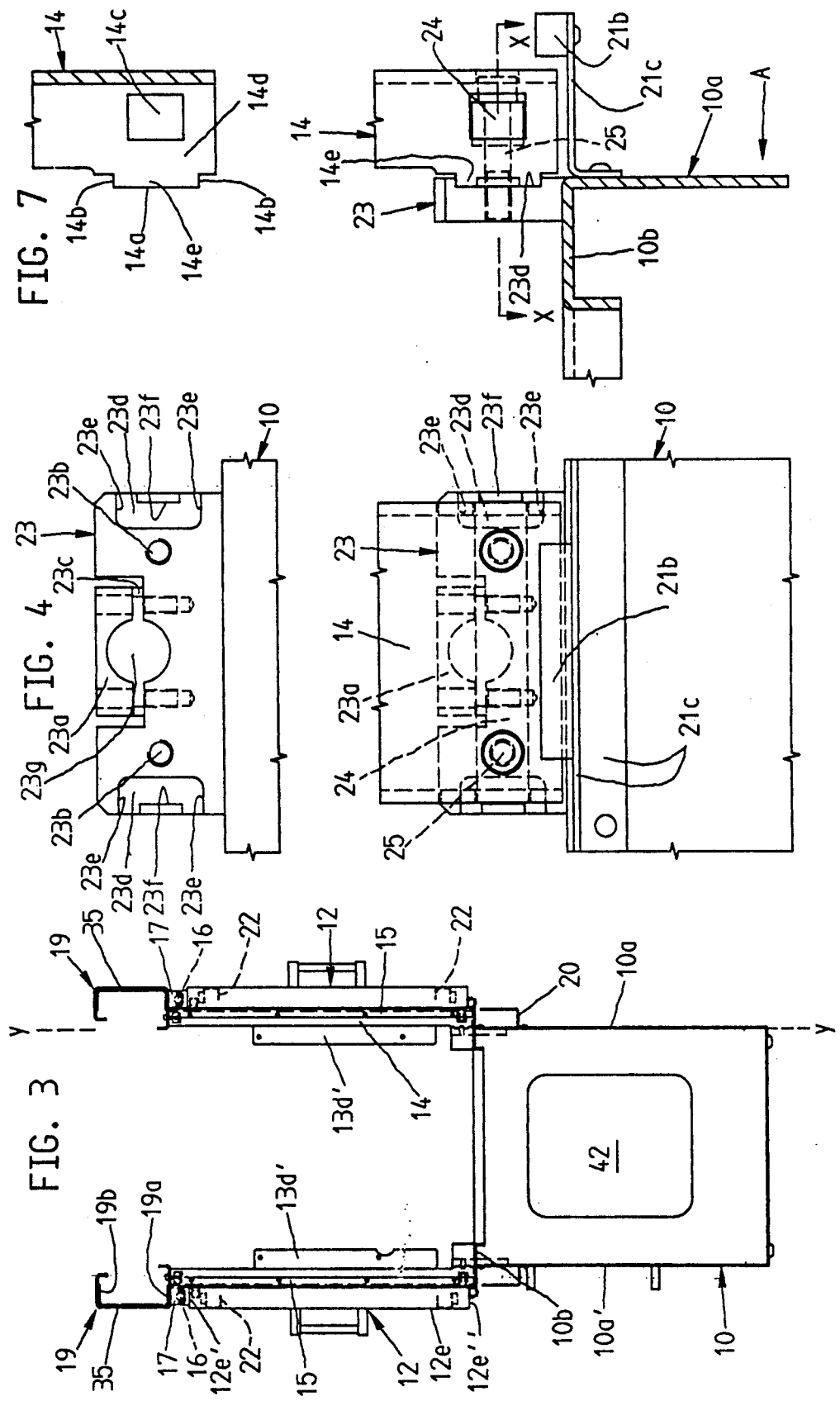

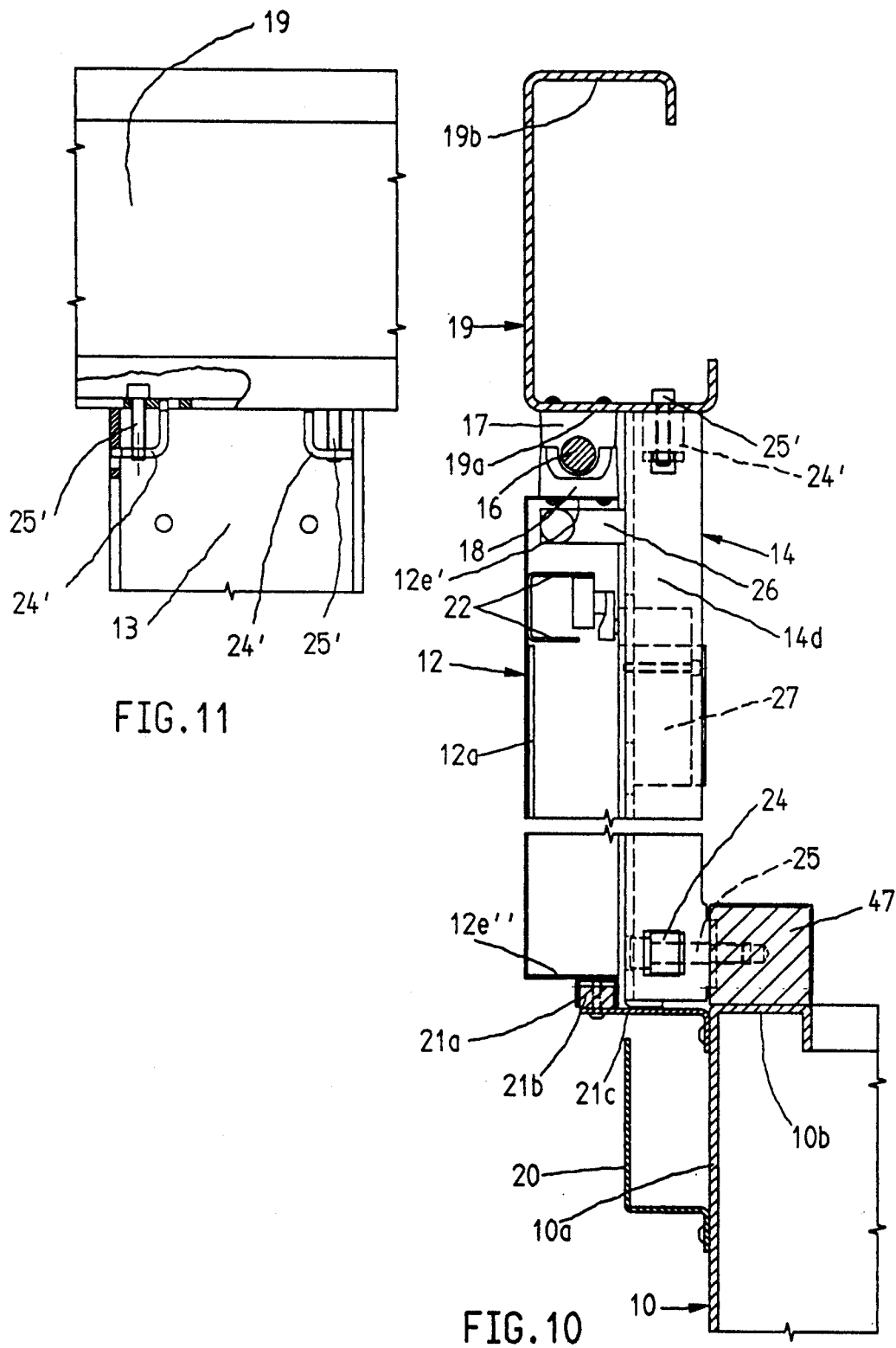

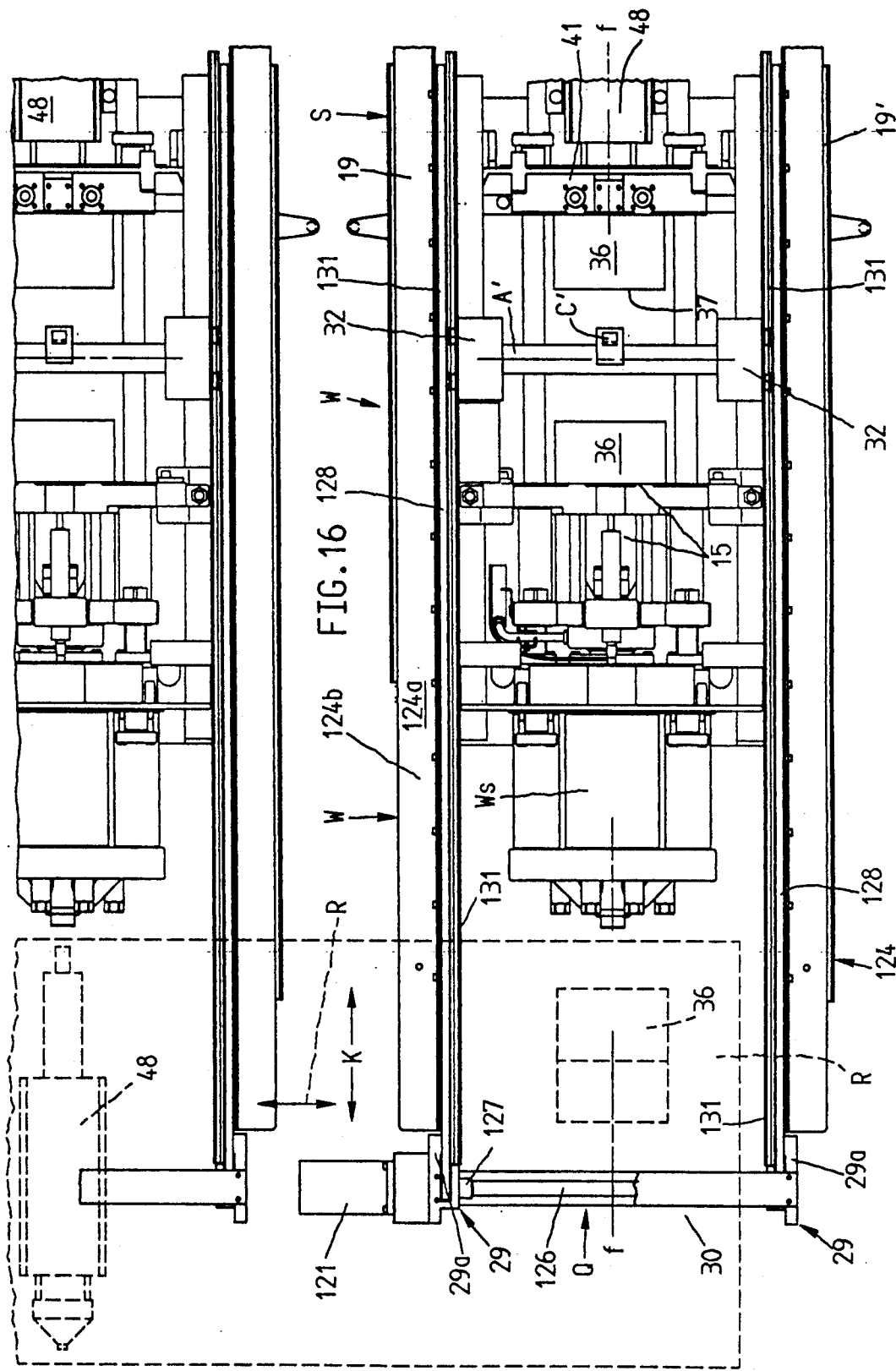

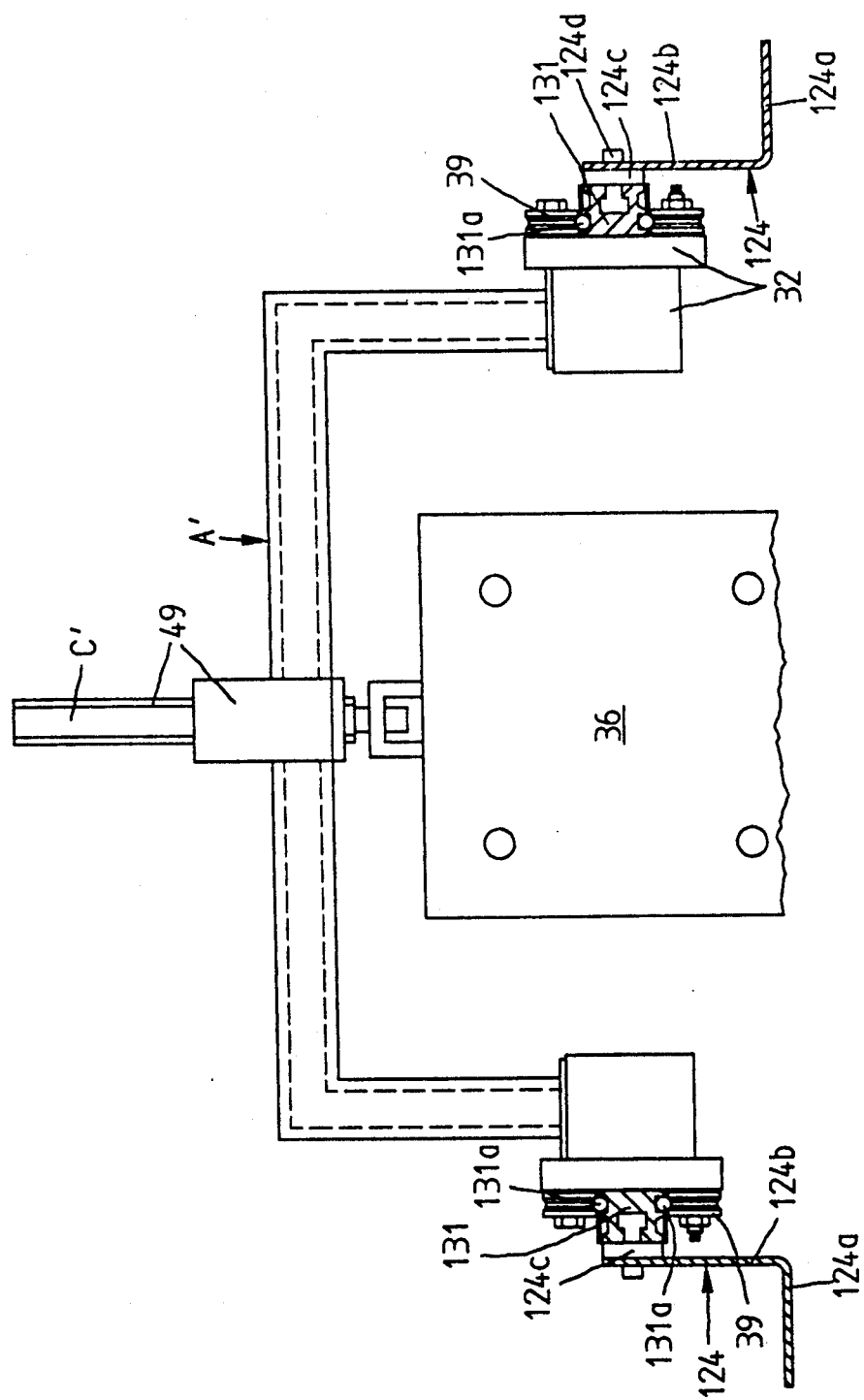

INJECTION MOLDING MACHINE COMPRISING A PROTECTIVE COVERING

CROSS REFERENCE TO RELATED APPLICATIONS

This is a continuation-in-part of co-pending U.S. patent applications Ser. No. 07/286,066 filed Dec. 19th, 1988 now abandoned and Ser. No. 07/406,833 filed Sept. 11th, 1989.

BACKGROUND OF THE INVENTION

1. Field of the Invention

This invention relates to an injection molding machine comprising a horizontally operable clamping unit, a mold defining a parting line, an injecting unit, which is operable in a direction that is transverse to said parting line, a pedestal having vertical longitudinal walls, which define interior chambers and one of which is disposed on the operator's side, and a protective covering having two vertical protective doors, which are disposed over and extend parallel to said one longitudinal wall, one of said protective doors covering the region which contains the mold and the other covering the region of a plasticizing cylinder that is included in said injecting unit, said protective covering also comprising vertical columns, which are supported on the pedestal and carry stationary tracks for guiding the protective doors and which are spaced from a centrally disposed stationary protective carrier, which has approximately the same size as each of the protective doors.

2. Description of the Prior Art

A prospectus by Battenfeld Maschinenfabriken GmbH entitled "Flexible Production Systems" (issued in February 1985) discloses an automated injection molding system in which, as illustrated on page 4, above the tool closing unit carrying bars are provided which are connected with transverse elements. The carrying bars have track rails for protective slides which may be displaced on the track rails in the longitudinal direction of the machine.

It is further known—as illustrated, for example, on page 11 of the Battenfeld prospectus—to arrange above the tool closing unit on one side a sole carrying bar to provide travel for a sled to transport moldings in a demolding system. The sled is arranged asymmetrically relative to the longitudinal axis of the injection molding machine.

In an injection molding machine that is known from U.S. Pat. No. 4,775,309, the clamping unit is shielded also from above by a stationary protective hood, which is portal-like in cross section. This is also the case in the mold region of the clamping unit; that mold region is adapted to be covered by a laterally disposed vertical protective door and by a horizontal upper protective door. The protective doors are adapted to be moved from a protecting position to a position under the corresponding covering portions of the protective hood. A portal-like stationary carrying frame for the entire protective covering for the clamping unit is assembled from cast iron shapes, which are provided with relatively short sleeves for guiding the protective doors. Sliding rods provided on the protective doors are horizontally guided in the guide sleeves. The same remarks are applicable to the protective door which serves to cover the plasticizing cylinder on the operator's side and which cooperates with guide sleeves, carried by a vertical cast iron column. The sliding rods provided on all protective doors are spaced from the top and bottom longitudinal edges of said doors. In an injection molding machine which comprises such a protective covering, which is also known from U.S. patent application Ser. No. 290,225, the height of the protective covering associated with the clamping unit may be relatively small because an unauthorized reaching from above into those regions of the clamping unit in which an accident may occur will be prevented by the horizontal guard provided there.

SUMMARY OF THE INVENTION

It is an object of the invention to provide an injection molding machine of the kind described first hereinbefore with a protective covering which can economically be manufactured in series and which can be used to meet different covering requirements, which are due to different degrees of automation of injection molding machines and/or to different arrangements of such machine, e.g., the installation of individual machines or the installation of a set of machines to form a transport line as shown in FIGS. 1 and 2 of U.S. Pat. No. 4,775,309.

Such a protective cover which is adaptable to a high degree to the various demands of the customers should be so structured that the requirements concerning a removal of moldings from the injection mold and, if needed, the requirements concerning an exchange of the mold itself are complied with in a technologically simple manner.

This object and others to become apparent as the specification progresses, are accomplished by the invention, according to which, briefly stated, the injection molding machine has a pedestal having front and rear vertical walls extending in a longitudinal direction and defining interior chambers, a mold carried by the pedestal, a clamping unit mounted on the pedestal and horizontally operable to open and close the mold, an injecting unit including a plasticizing cylinder and being mounted on the pedestal, two horizontal carrying bars, one being a front bar and the other being a rear bar, interconnected by crosspieces and supported by the pedestal, and a front protective covering carried by the pedestal and including a stationary protective carrier and two vertical protective doors. There are further provided stationary tracks mounted on the front bar and being adapted to guide the protective doors in the longitudinal direction of the injection molding machine. Further, track rails are mounted on each of the carrying bars and extending at least in part above the clamping unit. A first carriage is mounted on the track rails for travel thereon and an additional carriage is supported on the first carriage and includes a hoisting device.

The protective covering on the operator's side may be symmetrically designed with respect to a plane of symmetry (g—g in FIG. 1), which is transverse to the front longitudinal wall of the pedestal. If a protective covering is provided also over the rear longitudinal wall of the pedestal, the entire covering may be symmetrical with respect to two planes of symmetry (g—g; f—f in FIG. 1), which are at right angles to each other.

Different covering requirements as stated in the statement of the object may arise, e.g., for the following reasons: a customer desires to acquire an injection molding machine but does not require a program-controlled change of the mold and/or the plasticizing unit, which parts are to be carried away in a horizontal direction.

Another customer may require a fully automatic injection molding machine, which is provided on the rear with a change deck that is provided with a protective covering and intended to be used for a change of the mold and/or of the plasticizing unit. In both cases (with and without a program control), different covering requirements will arise dependent on whether the machine is individually installed and accessible from all sides or is installed in a set, as is disclosed in FIGS. 1 and 2 of U.S. Pat. No. 4,775,309. In the latter case it will be sufficient to cover the injection molding machine only on the operator's side. In a fully automatic injection molding machine provided with a change deck a protective covering on the operator's side is required to extend throughout the length of the longitudinal side of the injection molding machine whereas the rear protective covering may consist only of the two stationary guard plates because the protecting function assigned to the two protective doors and to the centrally disposed carrier is performed there by the protective covering for the change deck.

A more economical series manufacture is not only permitted by the fact that the protective covering has a higher symmetry so that its manufacture can be simplified by the making of modular parts and the stocking requirements are reduced. Costs may also be reduced by the use of protective coverings having such a height that the previously required upper horizontal protective covering for the clamping unit can be omitted.

A significant advantage of the apparatus for the removal of the moldings from the mold and their deposition in preparation for the successive transportation resides in that the carriage for the transport of the moldings is in the longitudinal symmetry plane of the injection molding machine and is supportable on both sides on the carrying bars and thus further specific customer requirements may be taken into account. A third carriage which carries a gripper is carried itself by a second carriage which, in turn, is displaceable on a rail of the first carriage, oriented perpendicularly to the carrying bars. In this manner, the molding grasped by the gripper may be deposited at any desired location of a relatively large area. Such an area is determined by the path length along which the first carriage may be displaced in the longitudinal symmetry plane of the injection molding machine and by the path length along which the second carriage may be displaced in a direction oriented perpendicularly to the longitudinal symmetry plane of the injection molding machine. It is a further advantage of the device for the removal of the moldings from the mold and its deposition in another position that it is to a significant extent, also adapted for the removal of the injection mold itself and its deposition on a conveyor track which extends externally of the base area of the injection molding machine. It is to be taken into account, however, that during the replacement of the injection mold significantly greater loads are to be transported than when moldings are removed from the injection mold. Accordingly, it may be required to design the first carriage and a lifting device secured medially to the first carriage for relatively large loads. If these requirements are complied with, it is further feasible to also lift the plasticizing cylinder of the injection molding unit from its working position and deposit it, at a location which is externally of the basic area of the injection molding machine, onto a track for the purpose of further transport.

It is feasible to associate a plurality of parallel-spaced injection molding machines with a conveyor that is perpendicular to the respective vertical symmetry planes of the injection molding machines. The conveyor may be formed as a roller track or may include a transporting carriage.

BRIEF DESCRIPTION OF THE DRAWING

FIG. 3 is an end view showing a protective covering of FIG. 1, which is mounted on a pedestal, whereas the clamping and injecting units and the end guard plate are not shown.

FIG. 4 is an enlarged view showing the fixing member of FIG. 6 viewed in the direction of the arrow A.

FIG. 5 shows the arrangement of FIG. 6 viewed in the direction A.

FIG. 6 is a sectional view taken on line VI—VI in FIG. 5.

FIG. 7 is a vertical sectional view showing the base portion of the column viewed as in FIG. 6.

FIG. 10 is a vertical sectional view showing the protective door covering a first region with a column.

FIG. 11 is a side elevation of the top part of the arrangement of FIG. 10 viewed from the rear side.

FIG. 16 is a top plan view of two side-by-side arranged injection molding machines according to the FIG. 15 construction, including a modified transport system for transporting injection molds and/or plasticizing cylinders on a common conveying track.

FIG. 17 illustrates the first, second and third carriages according to a further preferred embodiment, in a view similar to that of FIG. 14.

DETAILED DESCRIPTION OF THE PREFERRED EMBODIMENTS

It is an important feature of the invention that two horizontal carrying bars may be arranged above the clamping unit W and above the injection unit S symmetrically to a vertical longitudinal central symmetry plane (f—f) of the illustrated injection molding machine. The carrying bars support stationary track means for vertical protective doors 12, 12' as well as track rails 131 for a first carriage A which is movable horizontally, parallel to the plane f—f of the injection molding machine. The first carriage A constitutes a base component for a transport system in which moldings 63 and/or injection molds 36 and/or plasticizing cylinders or other units may be transported for removal or replacement. In the description which follows, in conjunction with FIGS.

1-11, first the injection molding machine will be described without the transport system and then in conjunction with FIGS. 13-17 the injection molding machine will be described with the transport system for transporting moldings after their removal from the injection mold or the transport of injection molds or plasticizing cylinders during their removal or replacement.

Figure 1:
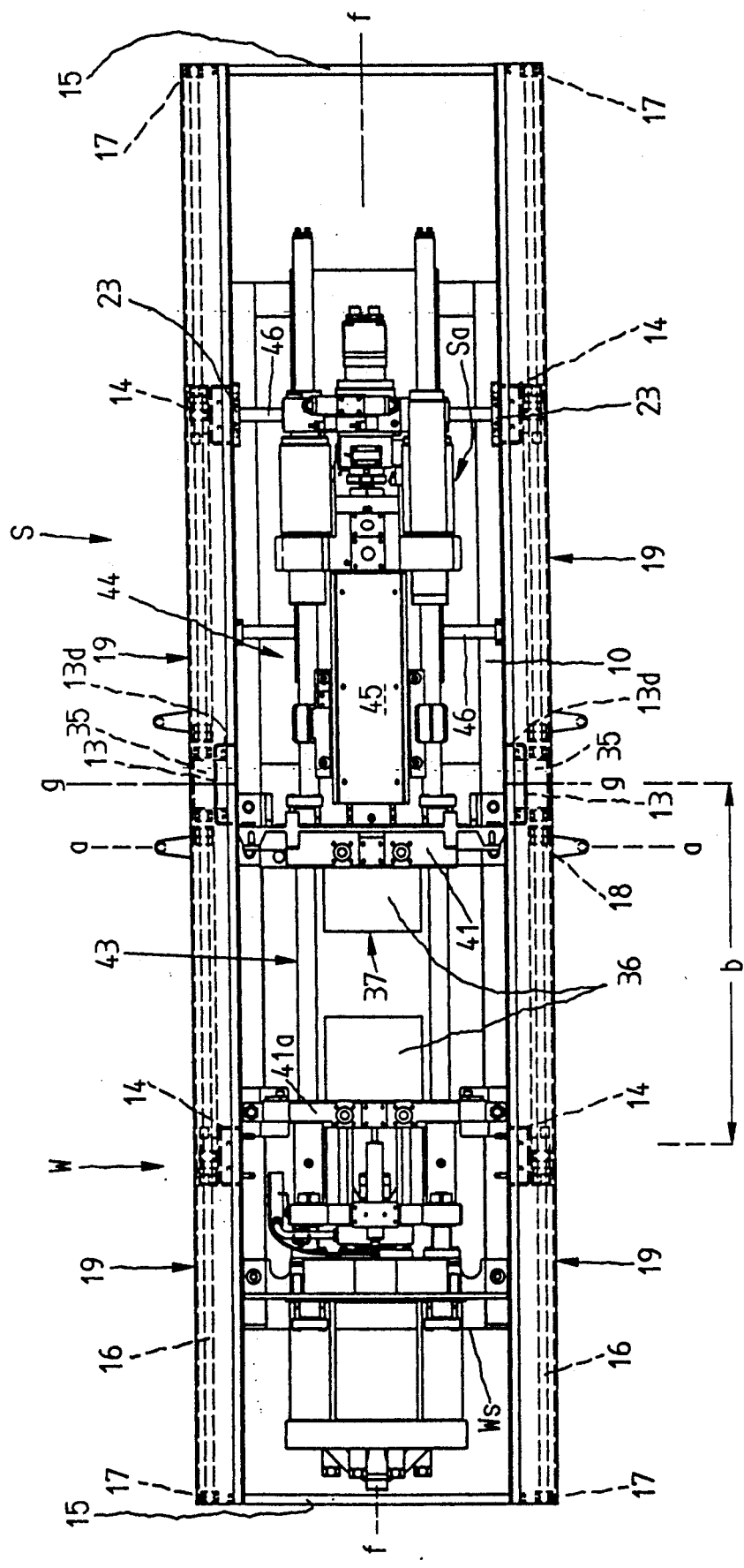
FIG. 1 is a top plan view showing two protective coverings respectively provided on the operator's side and the rear side of an injection molding machine.
Figure 2:
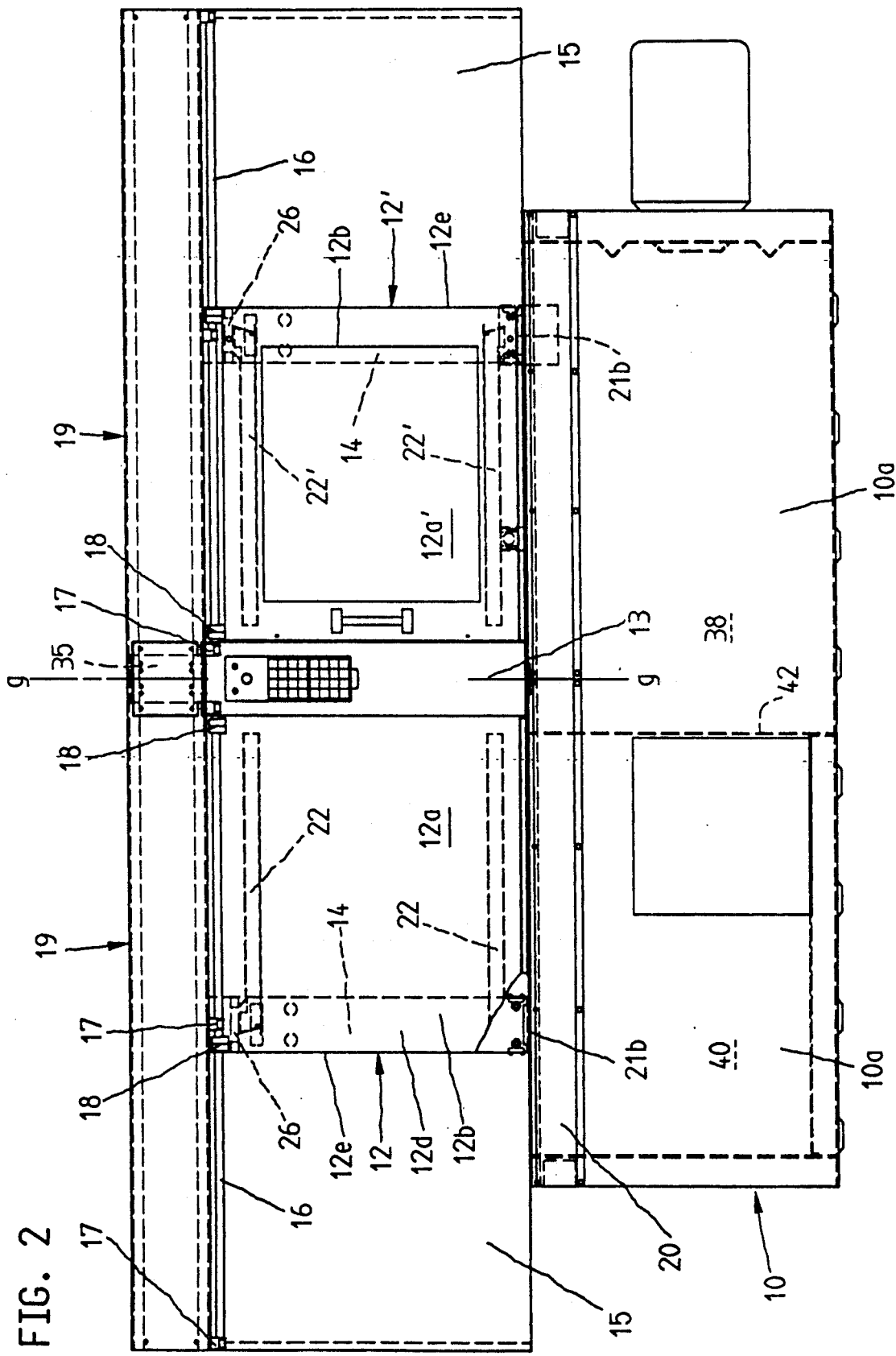
FIG. 2 is a side elevation showing a protective covering of FIG. 1.
Figure 8:
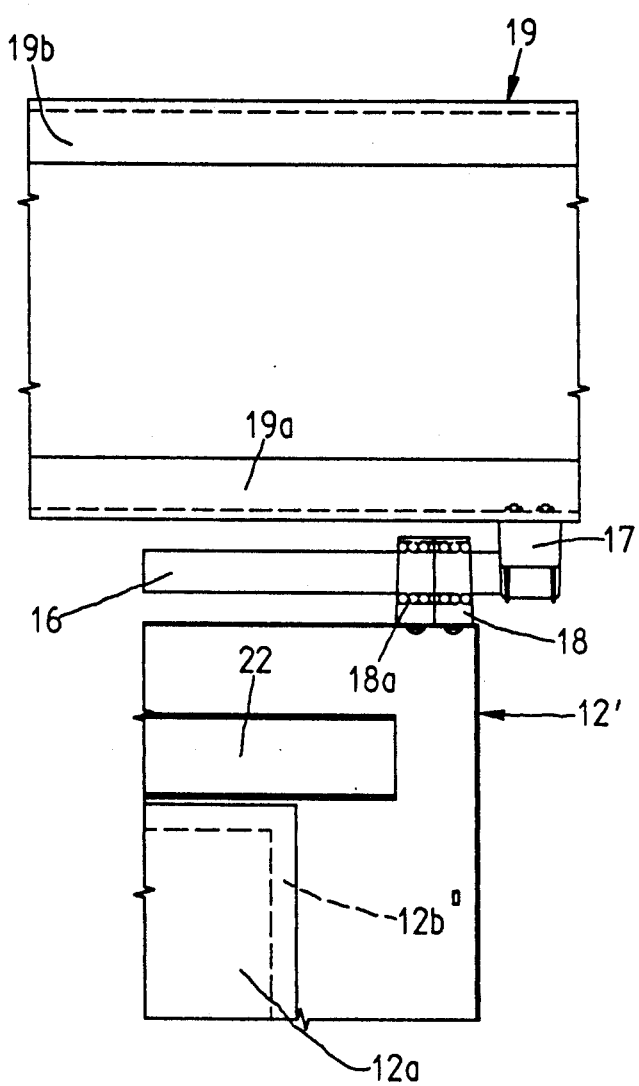
FIG. 8 is an enlarged fragmentary view showing a portion of the protective covering viewed from the operator's side.
Figure 9:
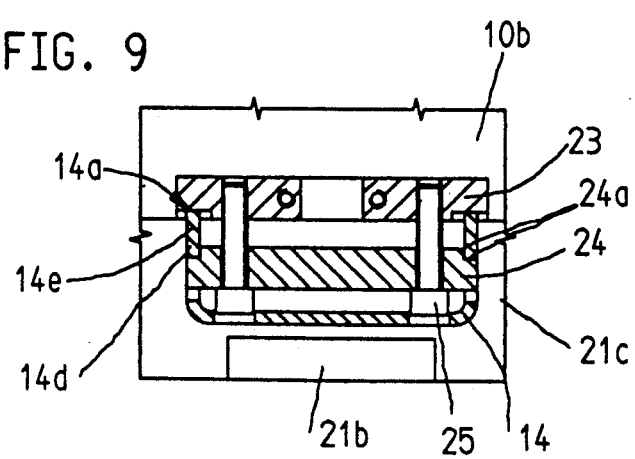
FIG. 9 is a sectional view taken on line IX—IX in FIG. 6.
Figure 12:
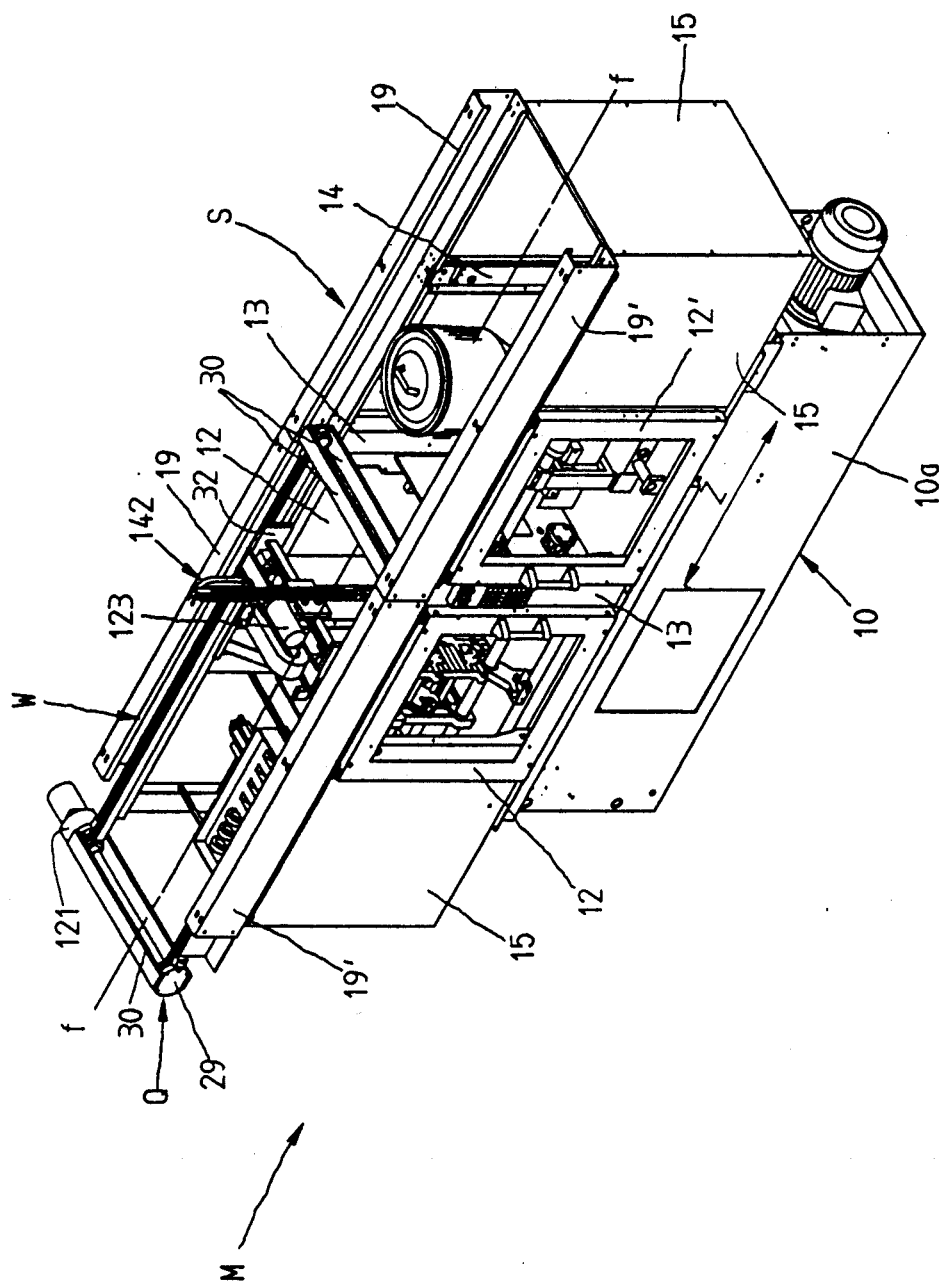
FIG. 12 is a perspective view of an injection molding machine according to the invention.

Description of the injection molding machine, in conjunction with FIGS. 1-11:

The injection molding machine that is provided with the protective covering comprises a horizontally operable clamping unit W and an injecting unit S, which is operable transversely to the parting line 37 defined by the mold 36. The pedestal 10 of the injection molding machine is generally parallelepipedic and is fabricated from sheet steel. The pedestal includes vertical front and rear longitudinal walls 10a, 10a', which are shown in FIGS. 2 and 3 and define a tank chamber 38 and a transport chamber 40, which is separated from the tank chamber 38 by a transverse partition 42. Two vertical protective doors 12; 12' are disposed over and parallel to the front longitudinal wall 10a, which is disposed on the operator's side. The protective door 12 is disposed in the region 43 (FIG. 1), which contains the mold 36. The other protective door 12' is disposed in the region 44 which contains the plasticizing cylinder 45. The two protective doors 12; 12' adjoin a stationary protective carrier 13, which is disposed approximately at the vertical longitudinal center line of the pedestal 10 and carries a keyboard for a direct manual control. In stationary tracks the protective doors 12; 12' are movable from their respective covering positions to positions on which said doors cover respective stationary guard plates 15 for the clamping subassembly Ws (FIG. 1) of the clamping unit W and for the drive subassembly Sa of the injecting unit. A profiled sheet steel carrying bar 19 is supported on columns 14 and extends over the protective doors 12; 12'. The columns 14 are spaced a distance b (FIG. 1) from the central stationary protective carrier 13. Said distance is approximately the same as the dimension of a protective door 12 or 12', measured in the longitudinal direction of the machine. The stationary tracks are constituted by track rods 16 and are mounted on said carrying bar 19 and extend adjacent to the top horizontal longitudinal edges of the protective doors. The carrying bar 19 is C-shaped in cross section and has an extended horizontal lower flange 19a (FIGS. 3, 9), which rests on the columns 14. The track rods 16 are connected by fasteners 17 to the flange 19a of the carrying bar 19 in such a manner that the track rods 16 extend outside the vertical plane y—y (FIG. 3) in which the front longitudinal wall 10a of the pedestal 10 is disposed. The protective doors 12; 12' are suspended by means of carrying sleeves 18 from the track rods 16, on which said sleeves 18 are mounted by means of ball bearings 18a. The carrying sleeves 18 engage a top horizontal stiffening flange 12e of the associated protective door 12 or 12'. The protective doors 12; 12' are laterally guided at their bottom horizontal longitudinal edges 12e'' by means of a stationary profiled track bar 21b (FIG. 9). For that purpose a channel bar 21a (FIG. 10) is secured to the bottom horizontal stiffening flange 12e of each protective door 12 or 12'. To provide a guidance for the protective door on both sides, the vertical flanges of the channel bar 21a overlap the stationary profiled track bar 21b, which is secured by a carrying web 21c to the adjacent longitudinal wall 10a.

In an embodiment which is not shown on the drawing, the arrangement of the top and bottom stationary tracks for the protective doors may be inverted in that the stationary track rods 16 extend along the bottom horizontal longitudinal edges of the protective doors 12, 12' and the stationary track rods 21b in FIG. 10 are provided at the top longitudinal edges of the protective doors. In that case the track rods 16 are secured to the longitudinal wall 10a of the pedestal 10 and the bars 21a (FIG. 10) for a lateral guidance are secured to a profiled carrying bar, which is functionally equivalent to the carrying bar 19. In such an embodiment the protective doors 12; 12' virtually stand on the track rods 16, which are secured to the pedestal, and are laterally guided at their top longitudinal edges on the stationary profiled track bars 21b (FIG. 10), which are secured to the profiled carrying bar.

Each of the columns 14 consists of a sheet steel channel bar and is provided with a reinforcing bar 47 on the side facing the clamping unit W. On the side facing the injecting unit S each column 14 is adapted to be centered by and clamped against a fixing member 23. The reinforcing bar 47 is approximately square in cross section and like the fixing member 23 is mounted on the inturned horizontal flange 10b (FIGS. 3, 6, 10) of the longitudinal wall 10a. The clamping unit W in its entirety can be centered on the reinforcing bar which constitutes a path for rollers of a device which is shown in FIG. 1 and supports the movable mold carrier. Each column 14 is adapted to be clamped against the reinforcing bar 47 and against the fixing member 23 by means of clamping member 24, which is supported by the flanges 14d (FIGS. 7, 9, 10) of the column, and by means of horizontally inserted clamp screws 25. As is particularly apparent from FIGS. 6, 7, 9, 10, the flanges 14d of the columns 14 are formed with apertures 14c. The free end portions of the clamping member 24 extend into the apertures 14c and have in the clamping portion 24a a shoulder, which during the clamping operation is forced against corresponding abutment surfaces of the flanges 14d. The clamp screws 25 have been screwed into the reinforcing bar 47 and into tapped bores 23b (FIG. 4) of the clamping member and extend through the clamping member 24 with a play so that the clamp screws 25 can be tightened to force the columns 14 against the reinforcing bar 47 and the fixing member 23. During that clamping operation, a centering is effected by profiled centering bars 14e extending into mating centering apertures formed in the reinforcing bar 47 and in the fixing member 23, respectively. As is particularly apparent from FIG. 10, the top end of each column 14 is adapted to be forced against the bottom flange 19a of the profiled carrying bar 19 by means of a clamping member 24', which is supported in the flanges 14d (FIGS. 7, 9, 10) of the column 14, and by means of vertically inserted clamp screws 25'. The clamping members 24' are supported in apertures of the flanges 14d like the clamping members 24 are supported in the lower end portions of the columns 14. Clamping is effected by a tightening of the clamp screws 25', which have been screwed into the clamping members 24'.

The protective carrier 13 (FIG. 2) is adjoined on both sides by the two protective doors 12; 12' and is secured to the stationary mold carrier 41 (FIG. 1). The carrier 13 is made of sheet steel and is also channel-shaped. For the fixation of the carrier 13, one of its flanges 13d is provided adjacent to the stationary mold carrier 41 with a fixing bar 13d', which is adapted to be screw-connected to the adjacent portion of a stiffening plate of the stationary mold carrier 41.

Just as each of the columns 14, the carrier 13 is adapted to be clamped against the lower leg 19a of the profiled carrying bar 19 by means of a clamping member, which is supported in the flanges 13d of the carrier 13, and by means of vertically inserted clamp screws. Those clamping means are not apparent in the drawing. The profiled carrying bar 19 is assembled from two identical bar sections so that the protective covering has a plane of symmetry g—g (FIGS. 1, 2), which is transverse to the longitudinal wall 10a of the machine frame 10. The two profiled sections of the profiled carrying bar 19 are screw-connected to each other with the aid of a connecting member 35 (FIG. 2). The profiled sections of the profiled carrying bar 19 protrude from the two ends of the pedestal 10 by a total overhang amounting to at least one-third of their length. The height of the protective covering is determined by the height of the protective doors 12, 12', of the carrying sleeves 18 and of the profiled carrying bar 19 and exceeds the height of the pedestal by about one-third. The protective doors 12; 12' as such have approximately the same height as the pedestal 10. As is apparent from FIG. 10 the horizontal flanges 19a, 19b of the profiled carrying bar 19 are inturned through 90°.

The carrying frame which carries the protective doors 12; 12' and the guard plates 15 comprises the profiled carrying bar 19, the columns 14 and the carrier 13 and is disposed outside the vertical plane y—y (FIG. 3) in which the longitudinal wall 10a is disposed. As is particularly apparent from FIG. 10, a cable duct is constituted by an angle bar 20, which has a vertical leg that is disposed in the same vertical plane as the surfaces of the protective doors 12; 12'.

In the illustrative embodiment shown on the drawing a protective covering which is identical to the protective covering over the front longitudinal wall 10a is provided over the rear longitudinal wall 10a' (FIG. 3) of the pedestal 10. The two identical protective coverings over the two longitudinal walls 10a, 10a' are symmetrically disposed with reference to a vertical plane of symmetry f—f (FIG. 1) of the injection molding machine. This means that four bar sections (which constitute the two profiled carrying bars 19), four stationary guard plates 15, four columns 14 and the associated fixing means, four track rods 16 and the associated fixing means, and four protective doors 12, 12' (without a handle and without switch-actuating bars) are provided as respective pairs of identical components. Each protective door 12, 12' comprises a rectangular frame 12d consisting of sheet steel channels. The associated inspection windows 12a, 12a' are adhered to the frame in sticking regions 12b. For the control of switches (such as the limit switches 27 in FIG. 10), which are secured to the columns 14, switch-actuating bars 22 are secured in such a manner to the horizontal bars of the frame 12d of each protective door that the switch-actuating bar 22 of the left-hand protective door 12 is a mirror image of the switch-actuating bar 22' of the other protective door 12'.

The front and rear protective coverings are interconnected by guard plates 15 (FIG. 1) at the ends. Said guard plates are identical to the stationary guard plates 15 over the longitudinal walls 10a, 10a' of the pedestal 10.

The displacement of the protective doors 12; 12' is limited by a double stop 26, which is secured to the associated column 14 and which extends into the frame 12d of the associated protective door adjacent to the horizontal stiffening flange 12e of that frame (FIGS. 2, 10). The fixing member 23 does not serve only as a clamping member for cooperation with the column 14 on the side facing the injecting unit S but, as is apparent from FIGS. 4, 5, the fixing member is formed with a bearing bore 23g for receiving a track rod on which the injecting unit can be horizontally displaced relative to the pedestal 10 and the track rod 46 is adapted to be clamped in the bearing bore 23g by means of a clamping member 23a, which is connected by a connecting web 23c to the remaining part of the fixing member 23. That connecting web 23c will be severed so as to release the fixing member 23 when it is necessary to displace the injecting unit and the track rod 46 transversely to the injection axis. The design and arrangement of the centering apertures which are formed in the fixing member and receive the centering rib 14e of the column 14 are particularly apparent from FIGS. 4 and 5. Engaging edges 14a (FIG. 7) of the flanges 14d of the columns 14 bear at the edges of the end faces on abutment surfaces 23d. Said abutment surfaces 23d are defined by centering surfaces 23e for a vertical centering and by centering surfaces 23f for a horizontal centering of the column 14. The centering surfaces 23e, 23f register with the centering edges 14b and the side faces of centering rib 14e.

Description of the injection molding machine in conjunction with FIGS. 12-15:

The injection molding machine is provided with a demolding device for a linear removal of the moldings 63 from the injection mold 36 in the open position thereof. The injection molding machine also comprises transfer means for transferring the moldings 63 to means for their further transportation. The two carrying bars 19, 19' extending over the clamping unit W are provided with track rails 131, on which the first carriage A is movable by a motor drive 121. The first carriage A carried on the rails 131 by means of rollers 39 is approximately symmetrical to the plane of symmetry f—f and is movable from a demolding station disposed over the parting line of the injection mold 36 to a delivery station. When the first carriage A is in the demolding station the demolding device removes the moldings 63 from the open injection mold 36 by means of a gripper 53. In the delivery station the gripper 53 deposits the moldings 63 on the supporting surface 55a of a pallet 55 (FIG. 15). The first carriage A comprises track rails 138 which extend between the two carrying bars 19, 19' at right angles to the plane of symmetry f—f. The rails 131 which support and guide the first carriage A extend at least throughout the length of the clamping unit W. The rails 131 are secured to the vertical legs 124b of the angle bars 124. The horizontal legs 124a of the angle bars 124 rest on legs of the carrying bars 19, 19' which consist of sheet metal sections. Together with crosspiece assemblies Q, Q', the carrying bars 19, 19' above the clamping unit W constitute a rectangular frame. The crosspiece assemblies Q, Q' are identical to each other and consist each of two end flanges 29 and two crossbars 30 which are diametrically arranged on the flanges 29. The track rails 138 (FIG. 14) of the first carriage A constitute a track for a second carriage B, which is, in accordance with a program, horizontally movable transversely to the direction of movement of the first carriage A.

A third carriage C comprises a lifting bar 142 and is vertically guided on guide rollers mounted in a bearing housing of the second carriage B. The gripper 53 for removing the moldings from the injection mold 36 is mounted on the lifting bar 142 at its lower end.

The structure and arrangement of the motor drives for the carriages A, B, C and of the running gears of such carriages will now be described. The second track rail 138 of the first carriage A is secured at both ends to bearing bracket 32. Each bearing bracket 32 comprises a flange 32a (FIG. 15) in which rollers 39 are rotatably mounted. As is particularly apparent from FIG. 14, a pair of upper rollers 39 roll on an upwardly facing curved surface 131a of the rail 131 and a pair of lower rollers roll on a properly disposed, downwardly facing curved surface 131a of the rails 131. The carriage A is provided with a drive motor 122 for driving the second carriage B which is movable on the track rail 138 of the first carriage A. The drive means for the first carriage A are integrated in the crosspiece assembly Q, which is provided at the end of the machine and extends between the two carrying bars 19, 19' and comprises end flanges 29, in each of which a pulley 127 is rotatably mounted which is provided with teeth. The two pulleys 127 are non-rotatably connected by coupling elements to a connecting shaft 126. A motor 121 is coaxially secured to one flange 29 and comprises a drive shaft for driving the associated drive pulley 127. The teeth of the two drive pulleys 127 mesh with respective cogged V belts 128. One course of each of the belts 128 is connected to the adjacent bearing bracket 32. As is particularly apparent from FIG. 15, the other crosspiece assembly Q' which is associated with the carrying bars 19, 19' and is disposed adjacent to the stationary mold support is similar in design to the crosspiece assembly Q provided at the end of the machine but has no connecting shaft. As is particularly apparent from FIGS. 15, 16, the flanges 29 of the crosspiece assembly Q are integrally formed with brackets 29a, which are secured to the rails 131 which support the first carriage A.

Figure 13:
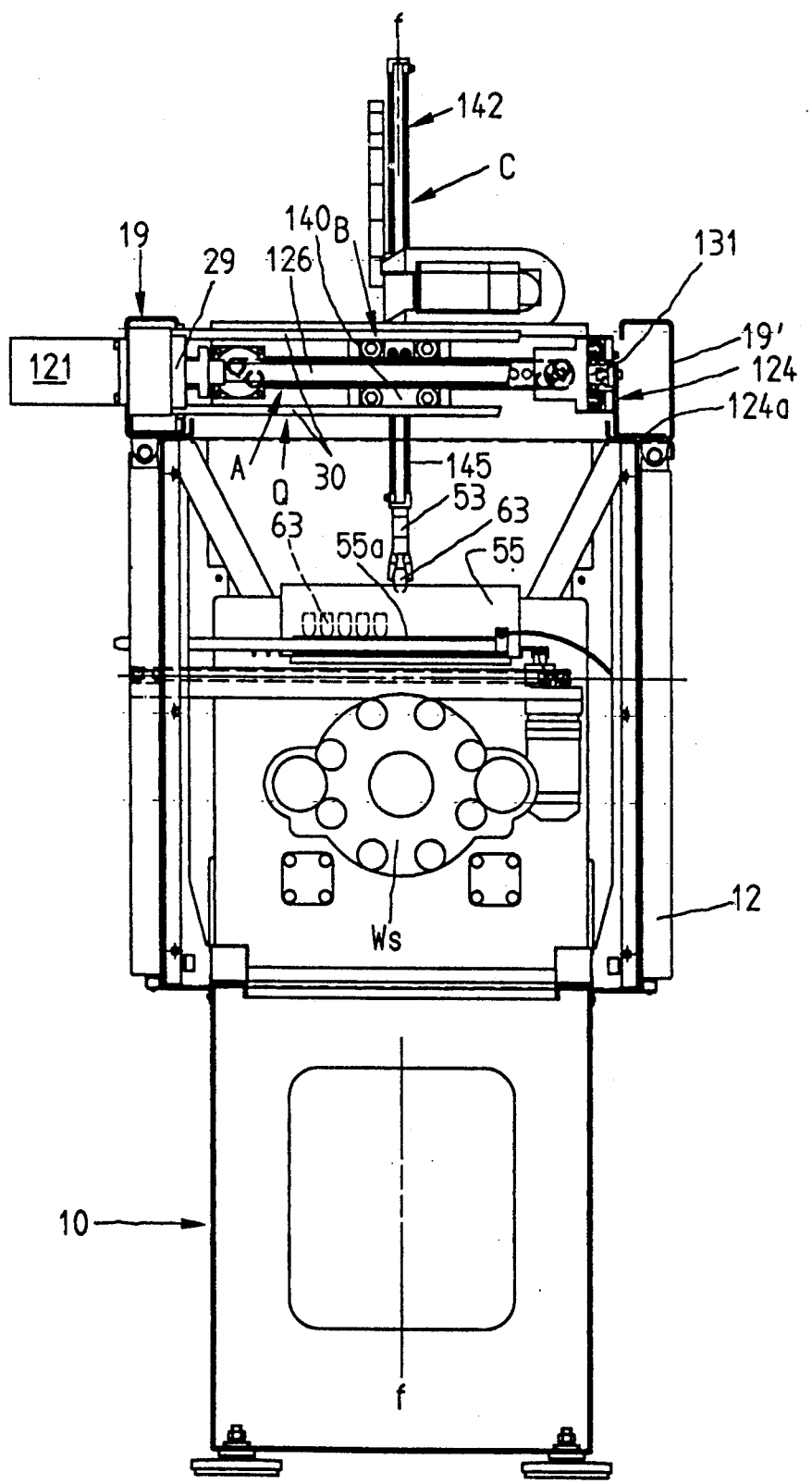
FIG. 13 is an end elevation of the machine of FIG. 12, as seen in the direction of arrow M shown in FIG. 12.
Figure 14:
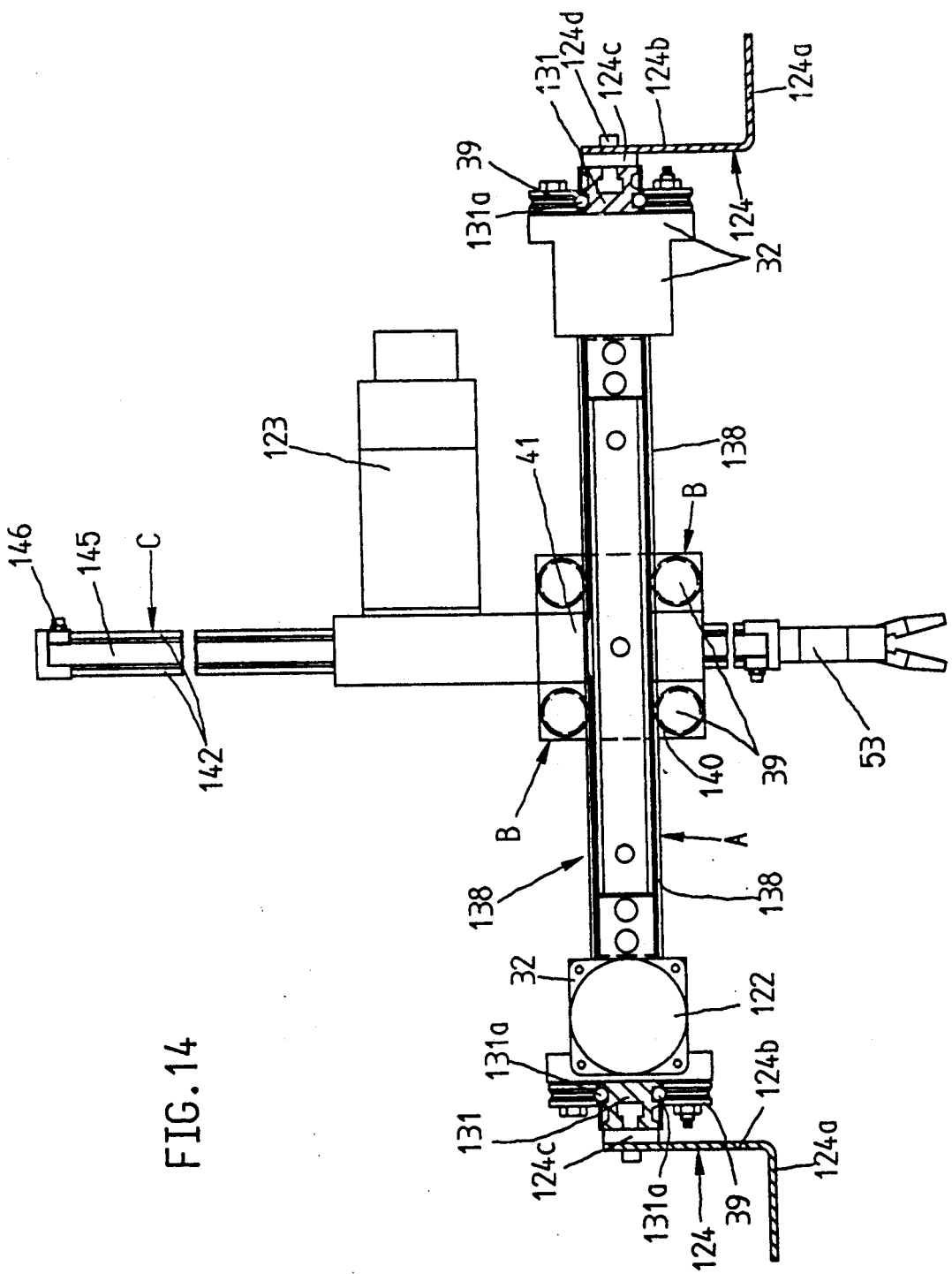
FIG. 14 illustrates the first, second and third carriages according to a preferred embodiment shown in FIGS. 1-15.
Figure 15:
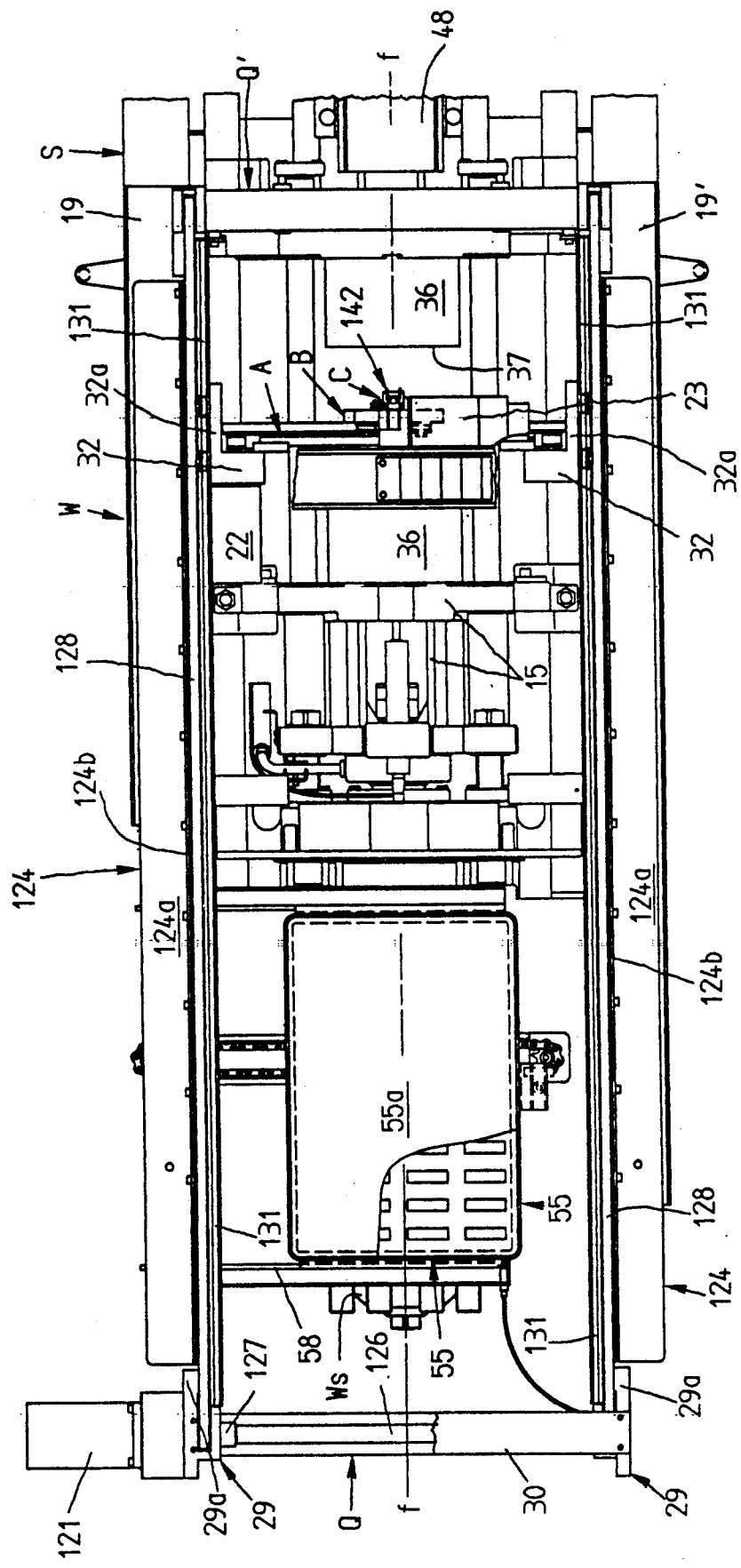
FIG. 15 is an enlarged top plan view of one part of the machine shown in FIG. 12.

Turning now in particular to FIGS. 13 and 14, the second carriage B comprises a body 140 which, by means of rollers 39, is movable on curved surfaces of the track rail 138 of the first carriage A. On that side of the carriage body 140 which faces the injection mold 36, the rollers 39 are rotatably mounted on the body 40 by securing screws. A drive pulley which is secured to the motor shaft of the drive motor 123 meshes with a cogged V belt held by means of passive pressure-applying rollers in mesh with the teeth of the drive pulley. A third carriage C comprises a lifting bar 142 which is guided on guide rollers rotatably mounted in a bearing housing. The lifting bar 142 is adapted to be driven by a V belt 145 which has free ends connected by a tensioning screw 146, to the lifting bar 142. The lifting bar 142 is under a tension which is adjustable by the tensioning screw 146. As seen in FIG. 14, the rails 131 and the angle bar 124 are interconnected by fixing screws 124d and spaced apart by the spacers 124c. The track rail 138 is secured to the bearing bracket 32.

The transport system which has the guide rails 131 on the carrying bars 19, 19', the first carriage A, the second carriage which may move on the first carriage transversely to the carrying bars 19, 19', the vertically movable third carriage C having a gripper 53 and which, as shown in FIGS. 13, 14 and 15, serves to transport the moldings 63 within a demolding device from the injection mold 36 to a depositing surface 55a is described in detail in U.S. patent application Ser. No. 07/406,833 filed Sept. 11th, 1989 which is incorporated herein by reference.

A further variant of the transport system is illustrated in FIGS. 16 and 17; it serves for replacing the injection mold 36 itself or it serves for the replacement of a plasticizing cylinder 48 (FIGS. 15, 16). This transport system differs from the earlier-described variant for transporting the moldings within the framework of a demolding machine essentially in the following features:

Underneath a terminal portion (FIG. 16) of the carrying bars 19, 19' a conveyor track R is provided which may be a roller track or which, in the alternative, may include a transport vehicle. The roller track extends perpendicularly to the vertical symmetry plane f—f of the injection molding machine. The first carriage A' is designed for larger loads and has in its middle a hoisting device 49 which serves like a third carriage. The hoisting device 49 is adapted to lift the injection mold S from the mold carriers 41, 41a (shown in FIG. 1) and after mutual locking of the two form halves it may lift them out of the form carriers and carry them over the conveyor track R and lower them onto the transporting face of the transport track.

The hoisting device 49 may also handle loads in a reverse sequence. In case the guide rails 131 are appropriately extended, a similar operation may be carried out with regard to a plasticizing cylinder for the purpose of its replacement. It is to be further noted that a pallet 55 may be provided on a conveyor track (as shown in FIG. 16) for receiving the moldings 63.

It will be understood that the above description of the present invention is susceptible to various modifications, changes and adaptations, and the same are intended to be comprehended within the meaning and range of equivalents of the appended claims.

What is claimed is:
1. An injection molding machine comprising:
   a pedestal defining a vertical longitudinal plane, said pedestal having front and rear vertical walls extending in a longitudinal direction, said vertical walls defining interior chambers,
   a mold carried by said pedestal, said mold being disposed in a first region; said mold defining a vertical parting line oriented transversely to said longitudinal direction,
   a clamping unit mounted on said pedestal; said clamping unit being horizontally operable to open and close said mold,
   an injecting unit including a plasticizing cylinder; said injecting unit being mounted on said pedestal and operable in said longitudinal direction into and out of engagement with said mold, said plasticizing cylinder being disposed in a second region,
   two horizontal carrying bars supported by said pedestal in cooperation with a plurality of vertical columns; one of said horizontal carrying bars being a front bar and one of said horizontal carrying bars being a rear bar; the carrying bars extending above said clamping unit and being oriented parallel to said vertical longitudinal plane; said carrying bars defining a distance between themselves; said distance corresponding to the distance between the walls of the pedestal; some of the vertical columns being front columns and some of the vertical columns being rear columns; at least the rear columns being disconnectably mounted on the pedestal and at least the rear bar being disconnectably mounted on the rear columns, crosspiece means for interconnecting said horizontal carrying bars, a front protective covering carried by said pedestal; said front protective covering including a stationary protective carrier, at least two of said vertical columns and two vertical protective doors; said stationary protective carrier extending parallel to said vertical longitudinal plane; said two vertical columns being spaced from the carrier; said two vertical protective doors having top horizontal edges extending in said longitudinal direction, said vertical protective doors extending parallel to said front vertical wall and said protective doors being adapted to assume a first covering position in which the two doors respectively cover said first and second regions, stationary track means mounted on the front bar and being adapted to guide said protective doors in said longitudinal direction; said stationary track means extending adjacent said top horizontal edges, track rails mounted on each of the carrying bars and extending at least in part above the clamping unit, a first carriage mounted on the track rails for travel thereon, and an additional carriage supported on the first carriage; said additional carriage forming a vertically operating hoisting means for individually lifting moldings, molds and plasticizing cylinders.

2. An injection molding machine as defined in claim 1, wherein said clamping unit comprises a clamping subassembly and said injecting unit comprises a drive subassembly and said protective covering comprises two stationary guard plates respectively covering said clamping subassembly and said drive subassembly, further wherein;

said two protective doors adjoin said carrier and are movable from said first covering positions in opposite longitudinal directions to a respective second covering position, said two doors respectively covering said two guard plates in the second covering position.

3. An injection molding machine as defined in claim 1, wherein said vertical longitudinal plane is a first vertical longitudinal plane; further wherein;

said at least one of said carrying bars includes a sheet steel channel bar, said sheet steel channel bar having an extended horizontal bottom flange resting on said columns, said pedestal being parallelepipedic and made of sheet steel, said front vertical wall defining a second vertical longitudinal plane, and said stationary track means comprising track rods extending on the outside of said second vertical longitudinal plane and are secured to said bottom flange.

4. An injection molding machine as defined in claim 3, wherein;

each of said protective doors is provided at said top horizontal edges with a first stiffening flange, said first stiffening flange having a top surface and a carrier sleeve being internally provided with ball bearings; said carrier sleeve being mounted on said top surface, said protective doors being movably mounted on said track rods by said ball bearings, said protective covering comprising stationary solid track bars carried by said front vertical wall, said protective doors having bottom horizontal edges extending in said longitudinal direction, said bottom horizontal edges being laterally guided by said solid track bars, each of said protective doors being formed along said bottom horizontal edges with a second stiffening flange, said second stiffening flange carrying a guide element, said guide element including a channel bar having depending vertical flanges, said guide element being mounted on a bottom surface of said second stiffening flange, and said channel bar embracing said solid track bars 5. An injection molding machine as defined in claim 1, wherein;

each of said columns includes a sheet steel channel bar having two flanges, said vertical walls having horizontally inturned top edge portions, said top edge portions carrying solid reinforcing elements, means comprising first clamping members supported in said flanges of each of said columns and horizontally extending first clamping screws extending with a play through said first clamping members; said first clamping screws being operable to force said columns against said reinforcing elements so as to center said columns, said flanges of said columns being formed with centering ribs, and said reinforcing elements having centering apertures for receiving said centering ribs, said carrying bar having a bottom flange, said columns being adapted to be forced against said bottom flange of said carrying bar by means comprising second clamping members supported in said flanges of said columns and vertically extending second clamping screws in threaded engagement with said second clamping members.

6. An injection molding machine as defined in claim 1, wherein said injection molding machine comprises a stationary mold carrier mounted on said pedestal, said stationary mold carrier carrying said mold, wherein;

said stationary protective carrier is secured to said stationary mold carrier, said stationary protective carrier having flanges and forcing means for urging said stationary protective carrier against a bottom flange of said carrying bar, said forcing means comprising a clamping member supported by the flanges of said stationary protective carrier and vertically extending clamp screws.

7. An injection molding machine as defined in claim 1, wherein;

said horizontal carrying bars are assembled from two identical bar sections protruding from two ends of said pedestal by a total overhand amounting to at least one-third of a carrying bar length, said protective covering having a height determined by a height of said protective doors, a height of said carrying sleeves and a height of said carrying bars and exceeding a height of said pedestal by about one third and said height of said protective doors being approximately the same height as said height of said pedestal.

8. An injection molding machine as defined in claim 1, wherein said vertical longitudinal plane is a first vertical longitudinal plane; further wherein said clamping unit comprises a clamping subassembly and said injecting unit comprises a drive subassembly and said protective covering comprises two stationary guard plates covering said clamping subassembly and said drive subassembly and said front vertical wall defining a second vertical longitudinal plane, wherein;

said horizontal carrying bars and said columns constitute a frame, said frame carrying said protective doors and said guard plates, said frame being disposed outside said second vertical plane, and a cable duct formed by an angle plate, said angle plate having a vertical flange lying in a common vertical plane with rear surfaces of said protective doors.

9. An injection molding machine as defined in claim 1, wherein said clamping unit comprises a clamping subassembly and said injecting unit comprises a drive subassembly and said protective covering comprises two stationary guard plates respectively covering said clamping subassembly and said drive subassembly, a rear protective covering being a mirror image of said front protective covering, said rear protective covering being associated with said rear vertical wall, said front and rear protective coverings being symmetrically arranged with respect to a vertical plane of symmetry of said injection molding machine, said front and rear protective coverings each comprising two of said horizontal carrying bars, said two profiled carrying bars each including two identical bar sections; said front and rear protective coverings each comprising two identical said stationary guard plates, two identical said columns, two identical track rods constituting said stationary track means, and two identical said protective doors; and said front and rear protective coverings being interconnected by said guard plates, said guard plates being disposed beyond ends of said pedestal.

10. An injection molding machine as defined in claim 1, wherein;

each of said protective doors comprises a generally rectangular frame, said rectangular frame being formed of sheet steel channel bars, an inspection window being adhered to said rectangular frame, limit switches being mounted on said columns, and two switch-actuating bars for actuating respective said limit switches, said two switch-actuating bars being secured to said frames and being mirror images of each other.

11. An injection molding machine as defined in claim 1, wherein said track rails are first track rails; further comprising:

second track rails mounted on said first carriage and being oriented perpendicularly to said carrying bars;

a second carriage supported on said second track rails for movement relative to said first carriage; said additional carriage being supported on said second carriage; said additional carriage being a third carriage.

12. An injection molding machine as defined in claim 11, wherein said hoisting means includes a gripper mounted on said third carriage; further comprising:

motor means for driving said first carriage; said first carriage being movable from a demolding position above said parting line to a delivery position remote from said parting line.

13. An injection molding machine as defined in claim 1, further comprising angle bars supported on the carrying bars and having vertical legs; said track rails being secured to said vertical legs.

14. An injection molding machine as defined in claim 1, further comprising:

a drive motor mounted on said crosspiece means;

flexible means connecting said drive motor to said first carriage for driving said first carriage; and pulley means mounted on said crosspiece means for guiding said flexible means.

15. An injection molding machine as defined in claim 1, wherein each said carrying bar has a length corresponding approximately to four times a width dimension of each said protective door; said carrying bars projecting beyond the pedestal at opposite ends thereof in the direction of said vertical longitudinal plane.

16. An injection molding machine as defined in claim 1, wherein said mold has a depth dimension; further wherein the carrying beams and the track rails project in a longitudinal direction beyond said clamping unit to an extent corresponding at least to said depth dimension.

17. An injection molding machine as defined in claim 16, wherein said plasticizing cylinder has a center of gravity; further wherein said track rails extend over said plasticizing cylinder, at least to said center of gravity.

18. An injection molding machine as defined in claim 1, further comprising a conveyor track extending transversely to said vertical longitudinal plane adjacent said clamping unit.

19. An injection molding apparatus comprising a plurality of parallel-arranged injection molding machines; each injection molding machine comprising:

a pedestal defining a vertical longitudinal plane, said pedestal having front and rear vertical walls extending in a longitudinal direction, said vertical walls defining interior chambers, a mold carried by said pedestal, said mold being disposed in a first region; said mold defining a vertical parting line oriented transversely to said longitudinal direction, a clamping unit mounted on said pedestal; said clamping unit being horizontally operable to open and close said mold, an injecting unit including a plasticizing cylinder; said injecting unit being mounted on said pedestal and operable in said longitudinal direction into and out of engagement with said mold, said plasticizing cylinder being disposed in a second region, two horizontal carrying bars supported by said pedestal in cooperation with a plurality of vertical columns; one of said horizontal carrying bars being a front bar and one of said horizontal carrying bars being a rear bar; the carrying bars extending above said clamping unit and being oriented parallel to said vertical longitudinal plane; said carrying bars defining a distance between themselves; said distance corresponding to the distance between the walls of the pedestal; some of the vertical columns being front columns and some of the vertical columns being rear columns; at least the rear columns being disconnectably mounted on the pedestal and at least the ear bar being disconnectably mounted on the rear columns, crosspiece means for interconnecting said horizontal carrying bars, a front protective covering carried by said pedestal; said front protective covering including a stationary protective carrier, at least two of said vertical columns and two vertical protective doors; said stationary protective carrier extending parallel to said vertical longitudinal plane; said two vertical columns being spaced from the carrier; said two vertical protective doors having top horizontal edges extending in said longitudinal direction, said vertical protective doors extending parallel to said front vertical wall and said protective doors being adapted to assume a first covering position in which the two doors respectively cover said first and second regions, stationary track means mounted on the front bar and being adapted to guide said protective doors in said longitudinal direction; said stationary track means extending adjacent said top horizontal edges, track rails mounted on each of the carrying bars and extending at least in part above the clamping unit, a first carriage mounted on the track rails for travel thereon, and an additional carriage supported on the first carriage; said additional carriage forming a vertically operating hoisting means for individually lifting moldings, molds and plasticizing cylinders;

said injection molding apparatus further comprising a conveyor track extending transversely to said vertical longitudinal plane of each said injection molding machine adjacent the clamping unit thereof; said injection molding machines being connected with one another by said conveyor track.

* * * * *